United States Patent [19]

Saito

[11] Patent Number: 5,147,898

[45] Date of Patent: Sep. 15, 1992

[54] PROCESS FOR PRODUCING A RIGID FOAM

[75] Inventor: Joichi Saito, Yokohama, Japan

[73] Assignee: Asahi Glass Company Ltd., Tokyo, Japan

[21] Appl. No.: 635,592

[22] PCT Filed: May 9, 1990

[86] PCT No.: PCT/JP90/00588

§ 371 Date: Mar. 11, 1991

§ 102(e) Date: Mar. 11, 1991

[87] PCT Pub. No.: WO90/13585

PCT Pub. Date: Nov. 15, 1990

[30] Foreign Application Priority Data

May 10, 1989 [JP] Japan .................. 1-114976

[51] Int. Cl.$^5$ .............................................. C08G 18/14
[52] U.S. Cl. ...................... 521/131; 521/157;
521/164; 521/167; 521/168; 521/169; 521/170;
521/172; 521/173; 521/174; 521/176; 528/71
[58] Field of Search .............. 521/131, 157, 164, 167,
521/168, 169, 170, 172, 173, 174, 176; 528/71

[56] References Cited

U.S. PATENT DOCUMENTS 3,988,268  10/1976  Dietrick et al. .................. 522/71
4,133,943  1/1990   Blahsk et al. ..................... 521/163
4,282,330  8/1981   Austin ............................... 528/71

*Primary Examiner*—Maurice J. Welsh
*Attorney, Agent, or Firm*—Oblon, Spivak, McClelland, Maier & Neustadt

[57] ABSTRACT

The present invention is a process for producing a rigid foam by reacting an active hydrogen compound containing an active hydrogen compound containing in its molecular structure a group of a neutralized salt or an alkoxide and a polyisocyanate compound in the presence of a halogenated hydrocarbon blowing agent and an assisting agent such as a catalyst.

The active hydrogen compound containing in its molecular structure a group of a neutralized salt or an alkoxide and other active hydrogen compounds are preferably polyols, particularly polyether polyols respectively.

The present invention has solved a problem of deterioration of the physical properties, which is problematic in a case where a rigid foam is produced by using a halogenated hydrocarbon blowing agent having hydrogen atoms, and is capable of producing a rigid foam equivalent to a conventional rigid foam obtained by using a halogenated hydrocarbon blowing agent having no hydrogen atoms.

8 Claims, No Drawings

PROCESS FOR PRODUCING A RIGID FOAM

TECHNICAL FIELD

The present invention relates to a process for producing a rigid foam. Particularly, it relates to a process for producing a rigid foam characterized by the use of a certain specific active hydrogen compound.

BACKGROUND ART

It has been widely practiced to produce a rigid foam by reacting an active hydrogen compound having at least two active hydrogen-containing groups reactive with isocyanate groups, with a polyisocyanate compound in the presence of a catalyst and a blowing agent. As the active hydrogen compound, a polyhydroxy compound or a polyamine compound may, for example, be mentioned. Various compounds are known as blowing agents for producing rigid foams. However, trichlorofluoromethane (R-11) is mainly used. Further, it is common to use water together with R-11. Further, in a case where foaming is conducted by e.g. a floss method, dichlorodifluromethane (R-12) having a lower boiling point (gaseous under atmospheric pressure at room temperature) is used together with them. Further, various proposals have been made to the effect that chlorinated fluorohydrocarbons having relatively low boiling points can be used as blowing agents, but none of them has been widely used except for the above mentioned R-11 and R-12. Further, it has been proposed to use instead of the chlorinated fluorohydrocarbon blowing agents other halogenated hydrocarbon blowing agents having low boiling points, such as methylene chloride.

A chlorinated fluorohydrocarbon which is extremely stable in the atmosphere such as R-11 or R-12 which has been widely used, is believed to reach the ozone layer located at the upper part of the atmosphere without being decomposed and then be decomposed by the action of e.g. ultraviolet rays, and the decomposed product is suspected to destroy the ozone layer. Part of such a chlorinated fluorohydrocarbon used as a blowing agent leaks into the atmosphere. Therefore, it is presumed that its use constitutes part of the cause of the destruction of the ozone layer. Accordingly, it has been required to reduce the amount of use of a blowing agent of such chlorinated fluorohydrocarbon type, or to replace it by other blowing agents.

As other blowing agents, halogenated hydrocarbons having hydrogen atoms, such as chlorinated fluorohydrocarbons having hydrogen atoms or fluorohydrocarbons having hydrogen atoms, have been proposed. However, if a halogenated hydrocarbon having hydrogen atoms is used, the initial strength of the resin during the production of a rigid polyurethane foam tends to substantially decrease, and the properties for a heat shielding material as one of the main uses of the rigid polyurethane foam, tend to be poor. Therefore, it is strongly desired to establish a technique to produce a rigid foam having high performance using a halogenated hydrocarbon having hydrogen atoms.

DISCLOSURE OF INVENTION

The present invention has been made to solve the above mentioned problems and provides a process for producing a rigid foam by reacting an active hydrogen compound and a polyisocyanate compound in the presence of a halogenated hydrocarbon blowing agent and an assisting agent such as a catalyst, characterized in that the whole or part of the active hydrogen compound is an active hydrogen compound containing in its molecular structure a group of a neutralized salt or an alkoxide.

The active hydrogen compound in the present invention comprises one or more compounds having at least two hydroxyl groups, primary amino groups, secondary amino groups, carboxyl groups or other active hydrogen groups reactive with isocyanate groups. And, at least part thereof is an active hydrogen compound containing in its molecular structure a group of a neutralized salt or an alkoxide. The main portion of the active hydrogen compound is preferably a polyol. The details of the active hydrogen compound will be described hereinafter.

In the present invention, the active hydrogen compound containing in its molecular structure a group of neutralized salt, is an active hydrogen compound having in its molecular structure an acidic group neutralized by a base, or a basic group neutralized by an acid. The acidic group includes, for example, a carboxylic acid group, a mercapto group and a phosphoric acid group, and the basic group includes, for example, primary to quaternary amino groups. The acid may be an inorganic acid such as hydrochloric acid, sulfuric acid or phosphoric acid, or an organic acid such as a carboxylic acid. The base may be an alkali metal compound such as an alkali metal hydroxide, an alkaline earth metal such as an alkaline earth metal hydroxide, or an amine. However, the present invention is not limited to such specific examples.

This active hydrogen compound is preferably the same polyol as described hereinafter, particularly the polyether polyol, except that it contains in its molecular structure a group of a neutralized salt. The polyol containing a neutralized salt can be synthesized by e.g. a method which comprises reacting a polycarboxylic acid or its reactive derivative with such a polyol to convert part of hydroxyl groups to a half ester and neutralizing it with a base, or a method which comprises substituting part of hydroxyl groups by amino groups or amino group-containing organic residues and neutralizing them with an acid. For example, a neutralized product of an acid-modified polyol can be produced by reacting a dicarboxylic anhydride with a polyol to form a half ester, which is then neutralized with an acid. Otherwise, the desired polyol may be synthesized by reacting an alkylene oxide with an initiator having an acidic group or a basic group to prepare a polyol, which is then neutralized. For example, a desired polyol may be obtained by neutralizing a polyether polyol obtained by adding an alkylene oxide to a carboxyl group-containing polyhydric alcohol or an amine. Further, a polyol having a group of an alkali metal carboxylate can be produced by reacting e.g. a carboxylic anhydride with a crude product of a polyether polyol synthesized by means an alkali metal catalyst and having an alkali metal catalyst component (wherein at least part of hydroxyl groups is converted to an alkali metal alkoxide). A similar polyol can be synthesized also by e.g. a method which comprises reacting an alkali metal hydroxide with a polyol to convert part of hydroxyl groups to alkoxy and then reacting a polycarboxylic anhydride therewith. Particularly preferred polyols are a polyol which is a product neutralized with an organic acid of an aminealkylene oxide addition polyol using the aftermentioned amine initiator, and a polyol which is a neutralized product of a polycarboxylic anhydride-modified polyol.

The amount of the active hydrogen compound containing in its molecular structure a group of a neutralized salt, may be a very small amount relative to the total active hydrogen compound to be adequately effective. For example, the number of the group of the neutralized salt per 100 active hydrogen groups of the total active hydrogen compound may be at least 0.01, particularly at least 0.1 to be effective. The upper limit is not particularly restricted, but is substantially the same number as the active hydrogen groups of the total active hydrogen compound, preferably 50, particularly 10, per 100.

As the alkoxide, an alkali metal alkoxide is preferred. Namely, a polyol obtained by converting part of hydroxyl groups of a polyol as the active hydrogen compound with an alkali metal alkoxide, is preferred as the active hydrogen compound containing in its molecular structure an alkoxide. As alkali metals, sodium and potassium are preferred. As the polyol converted with an alkali metal alkoxide, is preferably a partially alkoxide-modified product obtained by reacting part of hydroxyl groups of a polyol such as a polyether polyol, a polyester polyol or a polyhydric alcohol with an alkali metal or its compound such as an alkali metal, an alkali metal hydride or an alkali metal hydroxide. Further, it is also possible to employ a polyether polyol produced by means of an alkali metal catalyst and not removing the catalyst. In such a crude polyether polyol, at least part of the hydroxyl groups is converted with an alkali metal alkoxide. Namely, such a crude polyether polyol is the one obtained by reacting an alkylene oxide with an initiator to convert it to an alkali metal alkoxide, whereby at least part of the hydroxyl groups is in a state converted by an alkali metal alkoxide.

The amount of the active hydrogen compound containing in its molecular structure an alkoxide may be a very small amount relative to the total active hydrogen compound to be adequately effective. For example, the number of alkoxide groups per 100 active hydrogen groups of the total active hydrogen compound may be at least 0.01, particularly at least 0.1 to be effective. The upper limit is not particularly restricted, but is preferably 20, particularly 10, per 100 active hydrogen groups of the total active hydrogen compound.

In the present invention, the halogenated hydrocarbon blowing agent may, of course, be used alone or may be used in combination with other blowing agents. Especially, water may be used in combination with the halogenated hydrocarbon blowing agent in many cases. Other blowing agents useful in combination other than water include, for example, a low boiling point hydrocarbon and an inert gas. As the low boiling point halogenated hydrocarbon blowing agent, R-11 or R-12 may be used. However, these materials have the above mentioned problem of possible destruction of the ozone layer, and it is preferred to use them in combination with a halogenated hydrocarbon having hydrogen atoms. The halogenated hydrocarbon having hydrogen atoms may be a halogenated hydrocarbon having hydrogen atoms and containing fluorine atoms such as R-123 (1,1-dichloro-2,2,2-trifluoroethane), R-141b (1,1-dichloro-1-fluoroethane), or R-22 (monochlorodifluoromethane), or a halogenated hydrocarbon containing no fluorine atom such as methylene chloride. As the low boiling point hydrocarbon useful as said other blowing agent to be used in combination, butane or hexane may be mentioned, and as the inert gas, the air, nitrogen or the like may be mentioned.

The active hydrogen compound reactive with isocyanate groups may be a compound having at least two active hydrogen groups such as hydroxyl groups or amino groups, or a mixture of at least two such compounds. Particularly preferred are compounds having at least two hydroxyl groups or a mixture thereof, or a mixture comprising such a compound as the main component and an amino group-containing compound such as a polyamine or a monoalkanol amine. As the compounds having at least two hydroxyl groups, polyols widely used are preferred, but compounds having at least two phenolic hydroxyl groups (such as precondensates of phenol resins) may also be used. The polyols include a polyether polyol, a polyester polyol, a polyhydric alcohol and a hydroxyl group-containing diene polymer. It is particularly preferred to use at least one type of polyether polyols alone or in combination with other active hydrogen compound such as a polyester polyol, a polyhydric alcohol, a polyamine, an alkanol amine, etc. The polyether polyol is preferably a polyether polyol obtainable by adding a cyclic ether, particularly an alkylene oxide such as propylene oxide or ethylene oxide, to a polyhydric alcohol, saccharides, an alkanol amine, an aromatic polyamine, a polyhydric phenol or other initiators. Further, as the polyol, it is possible to use a polyol composition having fine particles of a vinyl polymer dispersed in a polyether polyol mainly composed of so-called a polymer polyol or a graft polyol. The polyester polyol includes a polyol of polyhydric alcohol/polybasic carboxylic acid condensate type and a polyol of cyclic ester ring-opening polymer type. Such a polyhydric alcohol includes ethylene glycol, propylene glycol, diethylene glycol, dipropylene glycol, glycerol, trimethylolpropane and pentaerythritol. The saccharides include sucrose, dextrose, sorbitol. The alkanol amine includes diethanol amine and triethanol amine. The polyamine includes ethylene diamine, toluenediamine, diaminodiphenyl methane and polymethylene polyphenyl amine. The polyhydric phenol includes bisphenol A, bisphenol S and a phenol resin precondensate. As the raw material for a rigid foam, a polyol, particularly a polyether polyol, having an average hydroxyl value of from 200 to 800 is preferred. In the present invention, such a polyol can be modified as described above to obtain a polyol containing in its molecular structure a group of a neutralized salt or an alkoxide. Further, the polyol containing such a group of a salt or the alkoxide may be used in combination with a polyol containing no such a group.

The polyisocyanate compound may be an aromatic, alicyclic or aliphatic polyisocyanate having at least two isocyanate groups, a mixture of at least two such polyisocyanates, or a modified polyisocyanate obtained by modifying such a polyisocyanate. Specifically, a polyisocyanate such as tolylene diisocyanate, diphenylmethane diisocyanate, polymethylene polyphenyl isocyanate, xylylene diisocyanate, isophorone diisocyanate or hexamethylene diisocyanate, a prepolymer-type modified product, nulate-modified product or urea-modified product thereof, may be mentioned.

For the reaction of the active hydrogen compound with the polyisocyanate compound, it is usually necessary to use a catalyst. As the catalyst, a metallic compound catalyst such as an organic tin compound, or a tertiary amine catalyst such as triethylene diamine, which promotes the reaction of the active hydrogen groups with the isocyanate groups, may be used. Further, an oligomerizing catalyst for reacting isocyanate groups themselves, such as a metal carboxylate, may also be used as the case requires. Further, a foam stabilizer for forming good foams is used in many cases. As the foam stabilizer, a silicone type foam stabilizer or a fluorine-containing compound type foam stabilizer may, for example, be mentioned. Other optional additives, a filler, a stabilizer, a colorant and a flame retardant may, for example, be mentioned.

By using these materials, a rigid polyurethane foam, a rigid polyurethane urea foam, a rigid urethane-modified polyisocyanate foam, a rigid urea-modified polyisocyanate foam, a rigid polyurea foam and other rigid foams can be obtained. The present invention is useful particularly for the production of a rigid foam such as a rigid polyurethane foam or a rigid urethane modified polyisocyanurate foam for heat shielding material, in the field where a halogenated hydrocarbon type blowing agent is used in a large amount. Among them, it is useful particularly for the production of a rigid polyurethane foam obtainable by using a polyol or a polyol mixture having a hydroxyl value of from about 200 to 800 and an aromatic polyisocyanate compound. To produce such a rigid foam, the amount of the halogenated hydrocarbon type blowing agent used in the present invention is usually from 5 to 150% by weight, particularly from 20 to 60% by weight, relative to the active hydrogen compound. Further, it is preferred to use water in an amount of from 0 to 10% by weight, particularly from 1 to 5% by weight, relative to the active hydrogen compound.

Now, the present invention will be described in detail with reference to Examples. However, the present invention is not restricted by such Examples. Further, "parts" means parts by weight.

EXAMPLES

Example I

Polyols

Polyols used were as follows:

Polyol A: A polyol obtained by adding 25 parts of phthalic anhydride to 100 parts of a polyoxyalkylene polyol having a hydroxyl value of 430 obtained by reacting propylene oxide with monoethanol amine and sucrose, reacting the mixture in a nitrogen atmosphere at 120° C. for 10 hours, and adding monoethanol amine to the product to adjust the pH to 7.0.

Polyol B: A polyol obtained by adding acetic acid to a polyoxyalkylene polyol having a hydroxyl value of 850 obtained by reacting propylene oxide with ethylene diamine, to adjust the pH to 7.0.

Polyol C: A polyoxyalkylene polyol having a hydroxyl value of 430 obtained by reacting propylene oxide and ethylene oxide with toluenediamine.

Foaming test

The production of the rigid polyurethane foam and the evaluation of foaming were conducted as follows. A polyol system solution obtained by mixing 2 parts of a silicone foam stabilizer, 1 part of water, N,N-dimethylcyclohexyl amine as a catalyst in an amount necessary to bring the gelling time to 45 seconds and a blowing agent composed of a combination of the following components ① to ③, to 100 parts by weight of a polyol, and a polymethylenepolyphenyl isocyanate, were mixed at a liquid temperature of 20° C. and introduced into a wood box of 200 mm×200 mm×200 mm and then foamed and cured to obtain a rigid polyurethane foam. The amount of the blowing agent used was an amount adjusted so that the core density of the foamed product would be $30\pm1$ kg/m$^3$.

Then, the physical properties of the obtained rigid polyurethane foam were evaluated. The results are shown in Table 1. The standards for evaluation of the foam were as follows:

○: Good
Δ: Fair
X: No good

Blowing agent

① R-11 100 wt %
② R-11 50 wt % + R-123 50 wt %
③ R-123 100 wt %

Here, R-123 represents 1,1-dichloro-2,2,2-trifluoroethane and R-11 represents trichlorofluoromethane.

TABLE 1

| No. | 1 | 2 | 3 | 4 | 5 | 6 | 7 |
|---|---|---|---|---|---|---|---|
| Polyol A (parts by weight) | 80 | 80 | — | — | — | — | — |
| Polyol B (parts by weight) | — | — | 100 | 100 | — | — | — |
| Polyol C (parts by weight) | 20 | 20 | — | — | 100 | 100 | 100 |
| Blowing agent used | ③ | ② | ③ | ① | ① | ② | ③ |
| Foam density | 30.2 | 29.9 | 29.8 | 30.1 | 29.8 | 30.1 | 30.0 |
| Appearance of the foam | ○ | ○ | ○ | ○ | ○ | Δ | X |
| Compression strength | ○ | ○ | ○ | ○ | ○ | Δ | X |
| Thermal conductivity | ○ | ○ | ○ | ○ | ○ | X | X |

Example II

Polyols used were as follows.

Polyol D: A polyol obtained by mixing 2 parts of an aqueous solution containing 50 wt % of sodium hydroxide with 100 parts of a polyoxyalkylene polyol having a hydroxyl value of 430 obtained by reacting propylene oxide with monoethanol amine and sucrose, removing water at 120° C. for 5 hours, thereafter further adding 4 parts of phthalic anhydride, and reacting the mixture in a nitrogen atmosphere at 120° C. for 10 hours.

Polyol E: A polyol obtained by mixing 2 parts of an aqueous solution containing 50 wt % of potassium hydroxide with 100 parts of a polyoxyalkylene polyol having a hydroxyl value of 430 obtained by reacting propylene oxide with monoethanol amine and sucrose, removing water at 120° C. for 5 hours, thereafter further adding 1 part of phthalic anhydride, and reacting the mixture in a nitrogen atmosphere at 120° C. for 10 hours.

Polyol F: A polyol obtained by mixing 17 parts of succinic anhydride with a polyoxyalkylene polyol having a hydroxyl value of 430 obtained by reacting propylene oxide and ethylene oxide with toluenediamine, reacting the mixture in a nitrogen atmosphere at 140° C. for 10 hours, and thereafter adding monoethanol amine thereto to adjust the pH to 7.0.

Polyol G: A polyol obtained by adding acetic acid to a polyol having an average hydroxyl value of 430 composed of a mixture of polyoxyalkylene polyols having a hydroxyl value of 300 obtained by reacting propylene oxide and ethylene oxide with toluenediamine and a polyoxyalkylene polyol having a hydroxyl value of 850 obtained by reacting propylene oxide with ethylene diamine, to adjust the pH to 7.0.

Polyol H: A polyoxyalkylene polyol having a hydroxyl value of 430 obtained by reacting propylene oxide with monoethanol amine and sucrose.

Foaming test

Rigid polyurethane foams were prepared in the same manner as in Example I using the above polyols. The amounts of other starting material components relative to 100 parts of the above polyols were the same as described above, and the reaction conditions were the same as above. The results are shown in Table 2.

TABLE 2

| No. | 8 | 9 | 10 | 11 | 12 | 13 | 14 |
|---|---|---|---|---|---|---|---|
| Type of the polyol | D | E | F | G | H | H | H |
| Blowing agent used | ③ | ② | ③ | ② | ① | ② | ③ |
| Foam density (Kg/m³) | 30.2 | 29.9 | 29.8 | 30.1 | 29.8 | 30.1 | 30.0 |
| Appearance of the foam | O | O | O | O | O | Δ | X |
| Compression strength (Kg/cm²) | 2.05 | 2.10 | 1.99 | 1.92 | 1.97 | 1.51 | 1.27 |
| Low temperature dimensional stability (%) (−30° C. × 24 hrs) | −0.1 | −0.9 | −1.0 | −1.5 | −0.1 | −19 | −30 |

Example III

Polyols

Polyols used were as follows.

Polyol I: A polyoxyalkylene polyol having a hydroxyl value of 450 obtained by adding 0.5 part of potassium hydroxide to 50 parts of monoethanol amine and 50 parts of sucrose, removing water at 100° C. under a reduced pressure of 10 mmHg for 3 hours and then reacting propylene oxide therewith. This polyol was prior to a purification step, and the alkali catalyst still remained in the polyol.

Polyol J: A polyoxyalkylene polyol having a hydroxyl value of 500 obtained by adding 1.0 part of sodium hydroxide to 100 parts of toluenediamine and reacting propylene oxide and ethylene oxide therewith. This polyol was prior to a purification step, and the alkali catalyst still remained in the polyol.

Polyol K: A polyoxyalkylene polyol having a hydroxyl value of 430 obtained by reacting propylene oxide with ethylene diamine. This polyol contains no alkali catalyst component.

Foaming test

Rigid polyurethane foams were produced in the same manner as in Example I using the above polyols. The amounts of other starting material components to 100 parts of the above polyols were the same as described above, and the reaction conditions were also the same as above. The results are shown in Table 3.

TABLE 3

| No. | 15 | 16 | 17 | 18 | 19 | 20 | 21 |
|---|---|---|---|---|---|---|---|
| Polyol I (parts by weight) | 100 | 80 | — | — | — | — | — |
| Polyol J (parts by weight) | — | — | 50 | 50 | — | — | — |
| Polyol K (parts by weight) | — | 20 | 50 | 50 | 100 | 100 | 100 |
| Blowing agent used | ③ | ② | ③ | ② | ③ | ② | ① |
| Foam density*1 | 30.8 | 29.3 | 30.5 | 30.0 | 29.5 | 30.1 | 29.1 |
| Appearance of the foam | O | O | O | O | X | Δ | O |
| Compression strength*2 | 1.95 | 2.08 | 1.90 | 2.10 | 1.25 | 1.75 | 1.89 |
| Dimensional change*3 | −0.3 | −0.2 | −0.4 | −0.3 | −40 | −10 | −0.5 |

*1Unit: Kg/m³
*2Unit: Kg/cm²
*3Dimensional change after being left to stand at −30° C. for 24 hours, unit: %.

I claim:

1. A process for producing a rigid foam by reacting an active hydrogen compound and a polyisocyanate compound in the presence of a halogenated hydrocarbon blowing agent and an assisting agent, characterized in that the whole or part of the active hydrogen compound is a polyether polyol containing in its molecular structure a neutral salt or an alkoxide, said polyether polyol having a hydroxyl value of from 200 to 800.

2. The process according to claim 1, wherein the active hydrogen compound containing in its structure a neutral salt, is a polyol comprising a neutralized product of an amine-alkylene oxide addition polyol with an organic acid.

3. The process according to claim 1, wherein the active agent hydrogen compound containing in its structure a neutral salt, is a polyether polyol comprising a neutralized product of a carboxyl group-containing polyol obtained by reacting a polycarboxylic anhydride with part of hydroxyl groups.

4. The process according to claim 3, wherein the neutralized product is an alkali metal salt.

5. The process according to claim 1, wherein the active hydrogen compound containing in its molecular structure an alkoxide, is a polyether polyol having part of hydroxyl groups converted with an alkali metal alkoxide.

6. The process according to claim 5, wherein the polyether polyol having part of hydroxyl groups converted with an alkali metal alkoxide, is a polyether polyol obtained by reacting an alkylene oxide with an initiator which is then converted to an alkali metal without removal of the alkali metal component.

7. The process according to claim 1, wherein the halogenated hydrocarbon blowing agent is a halogenated hydrocarbon blowing agent containing hydrogen atoms, or a mixture comprising such a halogenated hydrocarbon blowing agent and a halogenated hydrocarbon blowing agent containing no hydrogen atoms.

8. The process according to claim 7, wherein the halogenated hydrocarbon blowing agent containing hydrogen atoms is at least one halogenated hydrocarbon selected from the group consisting of 1,1-dichloro-2,2,2-trifluoroethane, 1,1-dichloro-1-fluoroethane, monochlorodifluoromethane and methylene chloride.

* * * * *